United States Patent [19]
Kumagai et al.

[11] Patent Number: 5,754,949
[45] Date of Patent: May 19, 1998

[54] TRANSMITTER-RECEIVER APPARATUS

[75] Inventors: Yoshiaki Kumagai, Kawasaki; Yutaka Oda, Sapporo, both of Japan

[73] Assignee: Fujistu Limited, Kanagawa, Japan

[21] Appl. No.: 592,186

[22] Filed: Jan. 26, 1996

[30] Foreign Application Priority Data

Mar. 27, 1995 [JP] Japan ................. 7-067996

[51] Int. Cl.$^6$ ........................................ H04B 1/02
[52] U.S. Cl. ................................. 455/115; 455/67.1
[58] Field of Search .................... 370/315, 343, 370/318, 278, 279, 281, 480, 489, 490, 492, 494, 495, 496; 379/296, 297, 287; 455/6.1, 3.2, 4.1, 92, 115, 63, 69, 126, 67.1

[56] References Cited

U.S. PATENT DOCUMENTS

| | | | |
|---|---|---|---|
| 5,229,997 | 7/1993 | Hirata et al. | 370/322 |
| 5,241,300 | 8/1993 | Buschmann | 340/573 |
| 5,257,415 | 10/1993 | Kumagai | 455/115 |
| 5,410,747 | 4/1995 | Ohmagari et al. | 455/115 |
| 5,448,766 | 9/1995 | Sanning et al. | 455/103 |
| 5,530,920 | 6/1996 | Takeda | 455/115 |

Primary Examiner—Wellington Chin
Assistant Examiner—Soon-Dong Hyun
Attorney, Agent, or Firm—Helfgott & Karas, P.C.

[57] ABSTRACT

An outdoor unit of a transmitter-receiver apparatus notifies an indoor unit of normal operation by transmitting an unmodulated carrier to the indoor unit via a cable when operation is normal, notifies the indoor unit of an abnormality by transmitting a monitor signal, which is obtained by modulating a carrier by alarm data, to the indoor unit when operation is abnormal, and restores the carrier to the unmodulated state at recovery from the abnormality. Further, the indoor unit transmits an unmodulated carrier to the outdoor unit via the cable if it is unnecessary to send a control signal, and transmits a modulated control signal, which is obtained by modulating a carrier by control data, to the outdoor unit via the cable if it is necessary to send a control signal. As a result, phase noise and the characteristic of spuriousness in the vicinity of the local oscillation frequency are unaffected even if the unmodulated carrier leaks into the reference frequency signal system. As a result, no deterioration is caused in the quality of the communication system.

4 Claims, 9 Drawing Sheets

MONITOR CONTROL SIGNAL
(UNMODULATED)

7.65MHz
(or 6.5MHz)

FIG. 8B

REFERENCE FREQUENCY
SIGNAL

10MHz

FIG. 9A

MONITOR CONTROL SIGNAL
(MODULATED)

7.65MHz
(or 6.5MHz)

FIG. 9B

REFERENCE FREQUENCY
SIGNAL

10MHz

TRANSMITTER-RECEIVER APPARATUS

BACKGROUND OF THE INVENTION

This invention relates to a transmitter-receiver apparatus and, more particularly, to a transmitter-receiver apparatus for sending and receiving, by frequency multiplexing, a transmission signal, a reception signal, a control signal which controls an outdoor unit, a monitor signal which notifies an indoor unit of the state of the outdoor unit and a reference frequency signal, between the outdoor unit and the indoor unit via a cable connecting the indoor unit and the outdoor unit, wherein the outdoor unit includes a transmitter-receiver and the indoor unit controls the outdoor unit.

Recent radio apparatus for a VSAT or entrance line is constructed by an outdoor unit (ODU) placed in a waterproof case and an indoor unit (IDU), in which the outdoor unit serves as a transmitter-receiver and the indoor unit monitors the outdoor unit and controls it. This arrangement is adopted owing to ease of installation. The outdoor unit and indoor unit are connected by one or a plurality of coaxial cables to carry transmission/reception signals and a highly stable reference frequency signal and to supply DC voltage for driving the outdoor unit. A monitor signal for notifying the indoor unit of various states of the outdoor unit and a control signal for controlling the outdoor unit are also transmitted bidirectionally through the aforementioned cable or cables as modulation waves. The transmission signal, reception signal, reference frequency signal, monitor signal and control signal are transmitted through the coaxial cable by frequency multiplexing.

Figure 7:
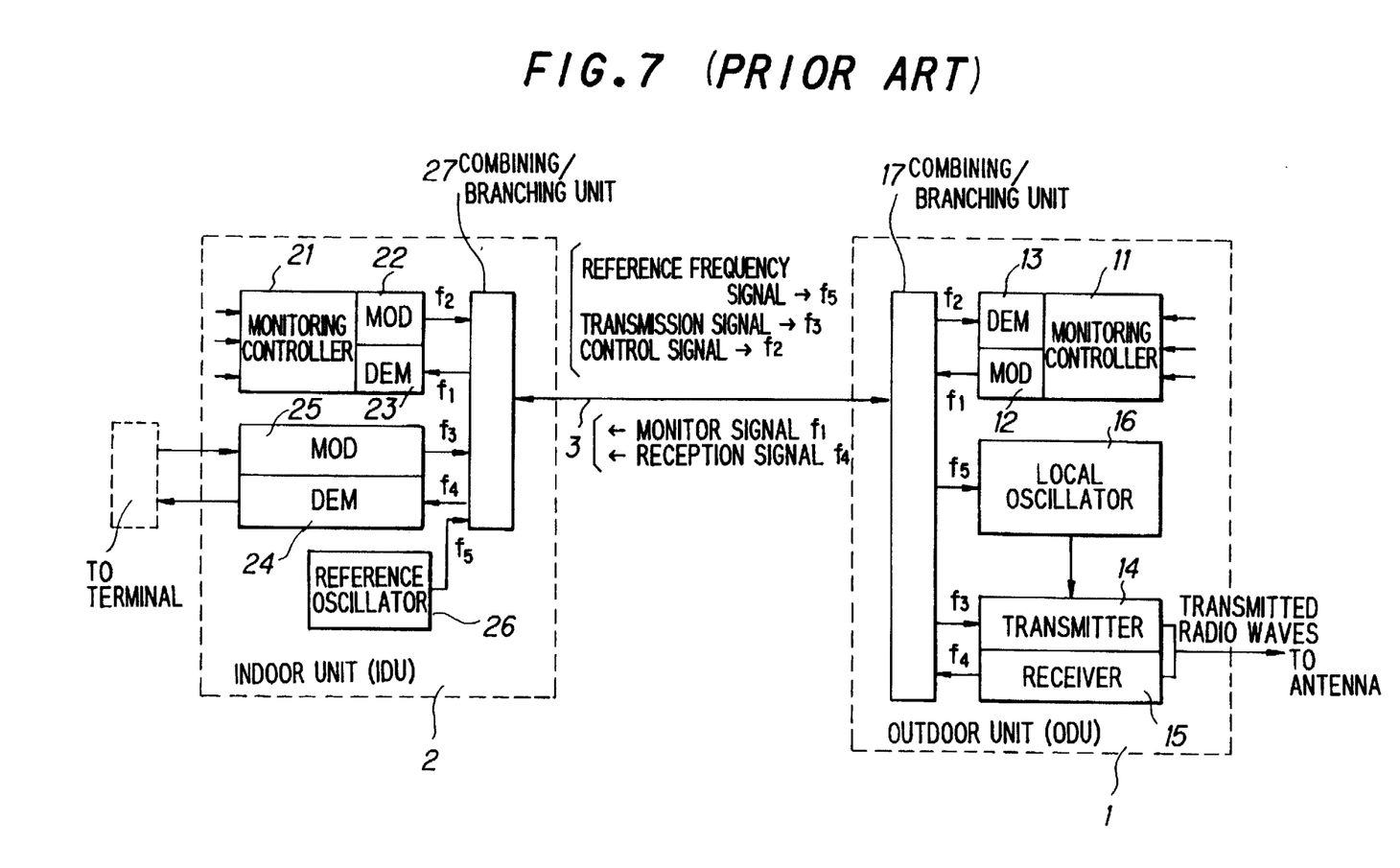
FIG. 7 is a block diagram showing the construction of a transmitter-receiver unit according to the prior art.

FIG. 7 is a block diagram showing such a transmitter-receiver system, which includes an outdoor unit 1, an indoor unit 2 and a coaxial cable 3 connecting the indoor and outdoor units.

The outdoor unit 1 includes a monitoring controller 11 which monitors various states of the outdoor unit as well as alarms (a decline in voltage level, a rise in temperature, loss of synchronism of an internal PLL, transmission output level, etc.), transmits these to the indoor unit as monitor signals and performs prescribed control based upon a control signal communicated from the indoor unit; a modulator 12 for modulating a carrier of frequency $f_1$ (=7.65 MHz) by the monitor data and transmitting the modulated signal; a demodulator 13 for demodulating modulated waves of frequency $f_2$ (=6.5 MHz) sent from the indoor unit and entering control data into the monitoring controller 11; a transmitter 14 for converting a transmission signal of frequency $f_3$ (=140 MHz) sent from the indoor unit to a wireless frequency on the gigahertz order, performing high-frequency amplification and sending the amplified signal to an antenna; a receiver 15 for converting a reception signal, which has entered from the antenna, to a signal of intermediate frequency $f_4$ (=1.2 GHz) and sending the signal to the indoor unit; a local oscillator 16 which, by employing a reference frequency signal of frequency $f_5$ (=10 MHz) sent from the indoor unit, creates a local clock used by various local oscillators in the outdoor unit, and a combining/branching unit 17 for combining/branching the various signals of frequencies $f_1$~$f_5$.

The indoor unit 2 includes a monitoring controller 21 for transmitting various set data (gain adjustment data, synthesizer frequency dividing ratio, power, etc.), which has entered from a control panel (not shown), to the outdoor unit as a control signal, and for performing prescribed control based upon a monitor signal communicated from the outdoor unit; a modulator 22 for modulating the carrier of frequency $f_2$ (=6.5 MHz) by control data and transmitting the modulated signal; a demodulator 23 for demodulating modulated waves of frequency $f_1$ (=7.65 MHz) sent from the outdoor unit and entering monitor data into the monitoring controller 21; a demodulator 24 for demodulating a reception signal, which is sent from the outdoor unit, and sending the demodulated signal to a terminal; a modulator 25 for modulating a carrier of frequency f3 (=140 MHz) by transmission data, which has entered from the terminal, and sending the modulated signal to the outdoor unit; a reference oscillator 26 for outputting a high-stability reference frequency signal; and a combining/branching unit 27 for combining/branching the various signals of frequencies $f_1$~$f_5$.

The reference oscillator 26 for outputting the reference frequency signal requires a high degree of stability and it is advantageous in terms of cost that one reference oscillator be shared by both the indoor and outdoor units. Accordingly, the reference oscillator is provided only in the indoor unit and the reference frequency signal is transmitted from the indoor unit 2 to the outdoor unit 1 via the cable 3.

The modulator 12 of the outdoor unit 1 modulates the carrier of frequency $f_1$ (=7.65 MHz) by the monitored data and transmits the modulated signal. More specifically, when operation is abnormal, the modulator 12 modulates the carrier by alarm data and then transmits the modulated signal. When operation is normal, on the other hand, the modulator 12 modulates the carrier by data indicative of normal operation and then transmits the modulated signal. Further, the modulator 22 of the indoor unit 2 modulates the carrier of frequency $f_2$ (=6.5 MHz) by control data and transmits the modulated signal. More specifically, when transmission of control data is necessary, the modulator 22 modulates the carrier by the control data and then transmits the modulated signal. When transmission of control data is unnecessary, the modulator 22 modulates the carrier by data indicative of the fact that control data is unnecessary and then transmits the modulated signal.

However, a problem which arises is that the modulated monitor signal or modulated control signal leaks into the reference frequency signal system of the outdoor unit via a brancher or power-supply circuitry, thereby increasing phase noise or spuriousness in the vicinity of the local oscillation frequency and causing a decline in the quality of the transmission system.

Figure 8A:
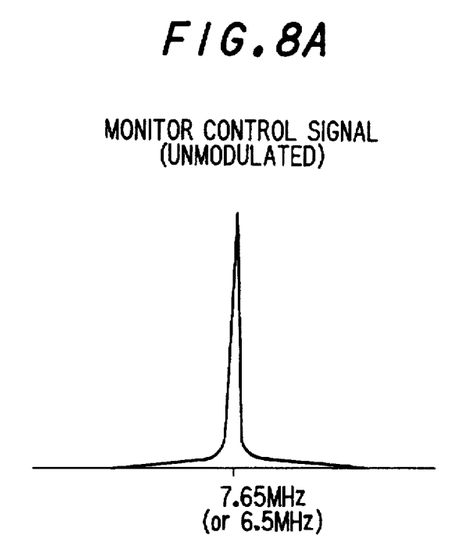
FIGS. 8A, 8B are spectra which result when no modulation is performed.
Figure 8B:
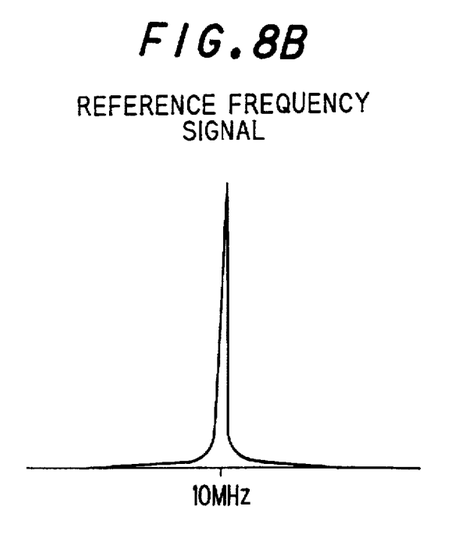
Figure 9A:
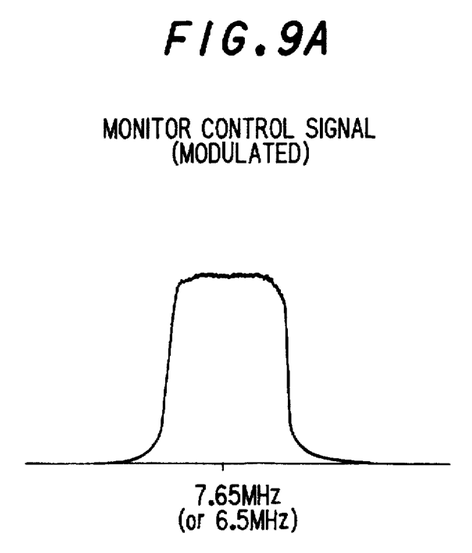
FIGS. 9A, 9B are spectra which result when modulation is performed.
Figure 9B:
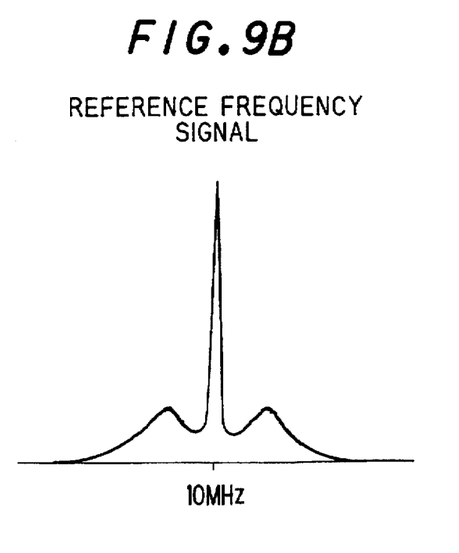

FIG. 8A is a spectrum of the monitor and control signal (unmodulated signals) when modulation is not performed, and FIG. 8B is a spectrum of the reference frequency signal when modulation is not performed. As apparent from FIGS. 8A and 8B, the reference frequency spectrum exhibits a steep characteristic and does not deteriorate. FIG. 9A is a spectrum of the monitor and control signal (modulated signals) when modulation is applied by the monitor data and control data, and FIG. 9B is a spectrum of the reference frequency signal when modulation is performed. It will be understood from FIGS. 9A and 9B that the spectrum of the reference frequency signal deteriorates owing to the effects of the modulated signal at the time of modulation.

Figure 10:
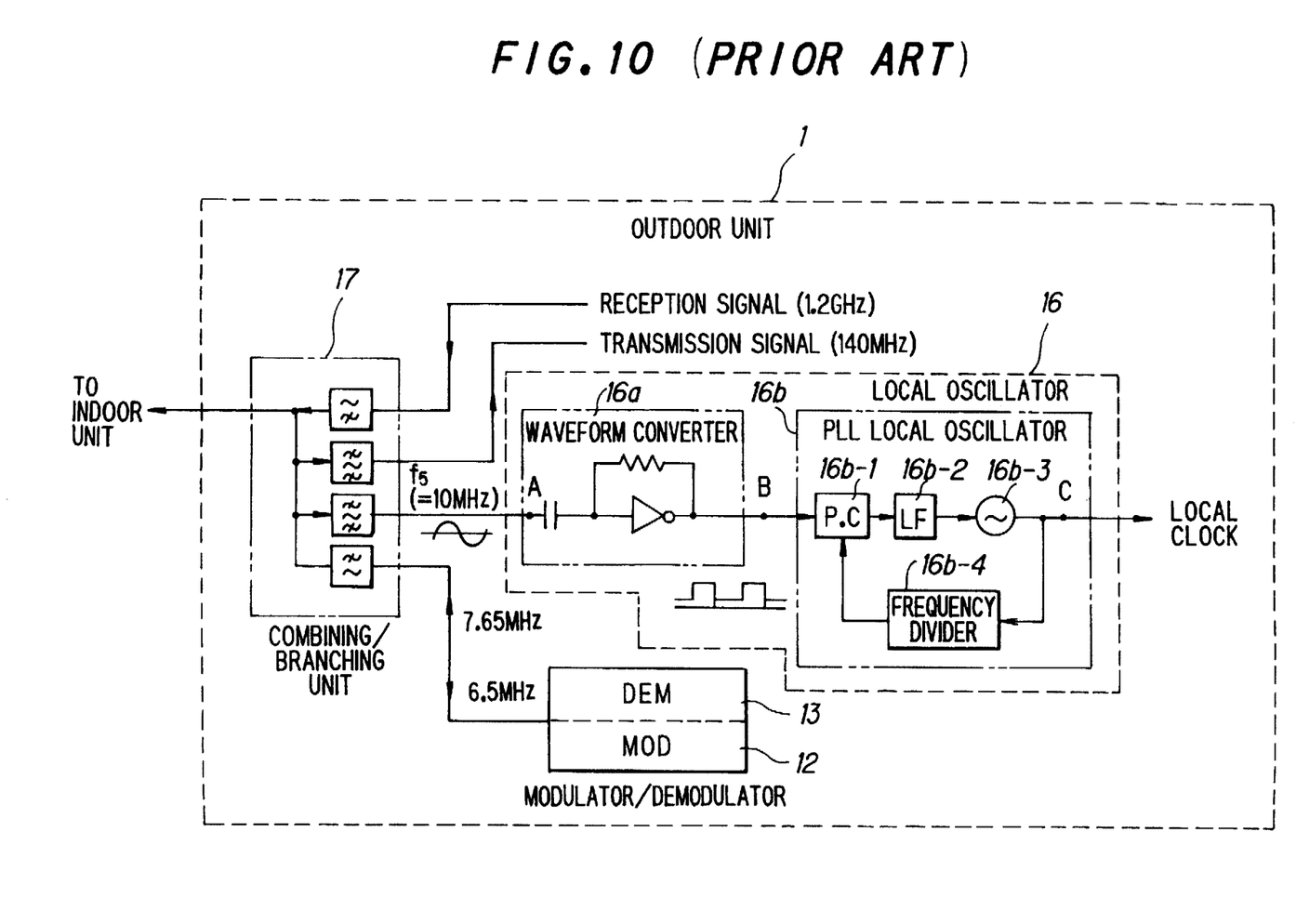
FIG. 10 is a diagram showing the construction of a principal portion of an outdoor unit according to the prior art.
Figure 11A:
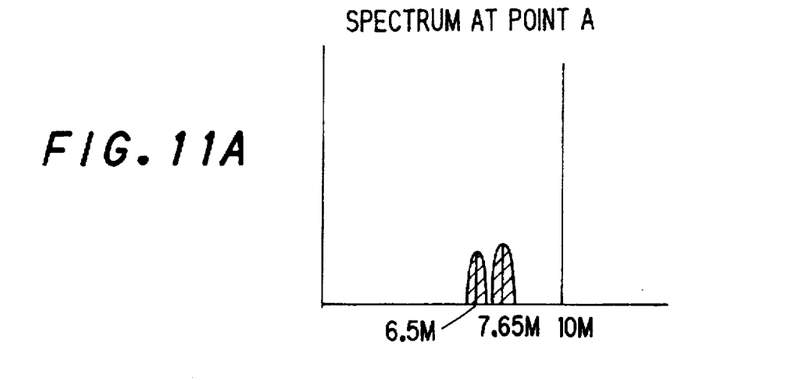
FIGS. 11A, 11B, 11C are diagrams for describing the process through which a spectrum deteriorates.
Figure 11B:
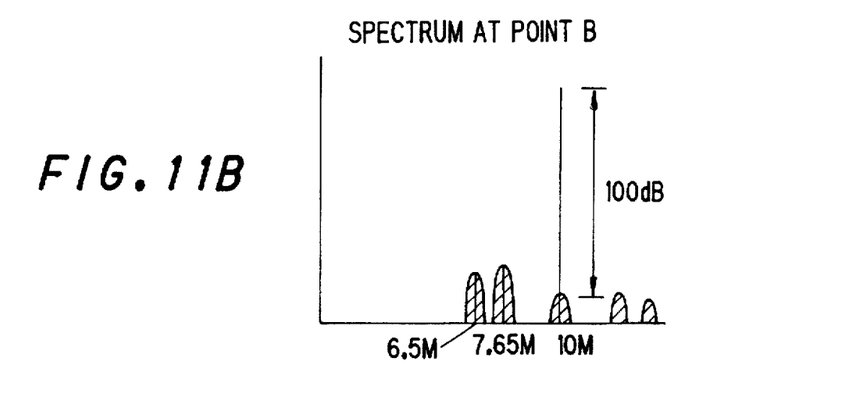
Figure 11C:
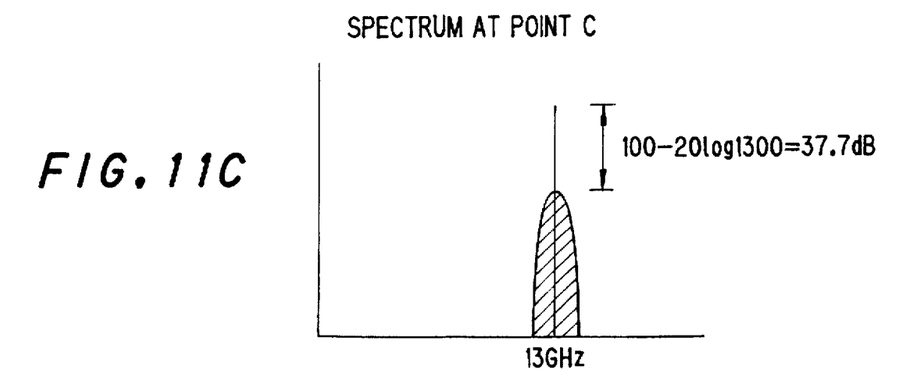

FIG. 10 is a diagram showing the principal portions of the outdoor unit 1 for the purpose of describing the process through which the spectrum deteriorates. Elements identical with those of FIG. 7 are designated by like reference characters. FIGS. 11A through 11C show spectra associated with various portions of the local oscillator 16.

The reference frequency signal of frequency $f_5$ (=10 MHz) sent from the indoor unit 2 is branched by a band-pass filter in the combining/branching unit 17 and enters the local oscillator 16. The local oscillator 16 has a waveform converter 16a for converting the 10 MHz reference frequency signal, which enters in the form of a sinusoidal wave, into a square wave and for applying the square wave to a PLL local oscillator 16b. The latter has a phase comparator 16b-1, a low-pass filter 16b-2 for smoothing the signal outputted by the phase comparator 16b-1, a voltage-controlled oscillator 16b-3 for outputting a local clock signal whose frequency is proportional to the voltage outputted by the low-pass filter 16b-2, and a frequency divider 16b-4 for frequency-dividing the frequency $f_c$ of the local clock to 1/N. The PLL local oscillator 16b performs control in such a manner that the relation $f_S=f_c/N$, i.e., $f_c=N \cdot f_S$, is established, and outputs a local clock signal of frequency $f_c$. It should be noted that the frequency $f_c$ of the local clock signal can be controlled by changing N, and that a transmission frequency of 13 GHz is obtained by establishing the relation N=1300.

However, the monitor signal and control signal (modulated signals) leak into the reference frequency signal system via the combining/branching unit 17 and the spectrum at an input point A of the waveform converter 16a becomes as shown in FIG. 11A. Owing to the leakage of the modulated signal and the nonlinearity of the waveform converter 16a, the reference frequency signal is modulated by the baseband signal of the monitor and control signals in the course of the conversion from the sinusoidal wave to the square wave and the spectrum at an output point B of the waveform converter 16a becomes as shown in FIG. 11B. Thus, the spectrum of the reference frequency signal deteriorates. The D/u ratio deteriorates by 20logN db in the course of the 1/N frequency division by the frequency divider 16b-4 of the PLL local oscillator 16a. As a consequence, the spectrum of the local clock signal undergoes further deterioration, as illustrated in FIG. 11C, thus having an adverse effect upon the quality of communication.

Accordingly, in order to prevent a deterioration in the local clock signal in the prior art, the above-mentioned adverse effect is minimized by improving the performance of the combining/branching unit 17 and strengthening the decoupling of the power-supply circuitry or splitting up the power-supply circuitry.

With this method, however, the compactness of the apparatus is sacrificed, there is an increase in power consumption and evolution of heat owing to a voltage drop and cost rises.

Further, if a failure develops in the monitoring control system of the indoor unit in the conventional method, control of the outdoor unit is rendered impossible until power is cut off artificially.

Furthermore, if an abnormality that cannot be detected by the outdoor unit itself occurs in the outdoor unit, transmission will continue and erroneous communication will result.

SUMMARY OF THE INVENTION

Accordingly, a first object of the present invention is to provide a transmitter-receiver apparatus in which monitoring and control of the transmitter and receiver are performed without taking large-scale measures involving circuitry, namely through a simple arrangement, and without affecting phase noise and the characteristic of spuriousness in the vicinity of the local oscillation frequency.

A second object of the present invention is to provide a transmitter-receiver apparatus in which a transmission from the outdoor unit can be halted promptly in automatic fashion even in a case where a failure develops in the monitoring control system of the indoor unit.

A third object of the present invention is to provide a transmitter-receiver apparatus in which, when an abnormality that cannot be detected by the outdoor unit itself develops in the outdoor unit, a transmission from the outdoor unit can be halted promptly by detecting the abnormality using the indoor unit.

According to the present invention, the first object is attained by providing the outdoor unit with means for notifying the indoor unit of normal operation by transmitting an unmodulated carrier to the indoor unit via a cable when operation is normal, notifying the indoor unit of an abnormality by transmitting a monitor signal, which is obtained by modulating a carrier by alarm data, to the indoor unit when operation is abnormal, and restoring the carrier to the unmodulated state at recovery from the abnormality.

According to the present invention, the first object is also attained by providing the indoor unit with means for transmitting an unmodulated carrier to the outdoor unit via a cable if it is unnecessary to send a control signal, and transmitting a modulated signal, which is obtained by modulating a carrier by control data, to the outdoor unit via the cable if it is necessary to send a control signal.

The second object of the present invention is attained by providing the indoor unit with means for halting carrier transmission of a control signal sent to the outdoor unit and providing the outdoor unit with means for detecting interruption of the carrier of the control signal and halting emission of radio waves.

According to the present invention, the third object is attained by providing the indoor unit with means for sending the outdoor unit a control signal which halts emission of radio waves when interruption of the carrier of the monitor signal from the outdoor unit has been detected.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (A) Overview of the Invention

Figure 1:
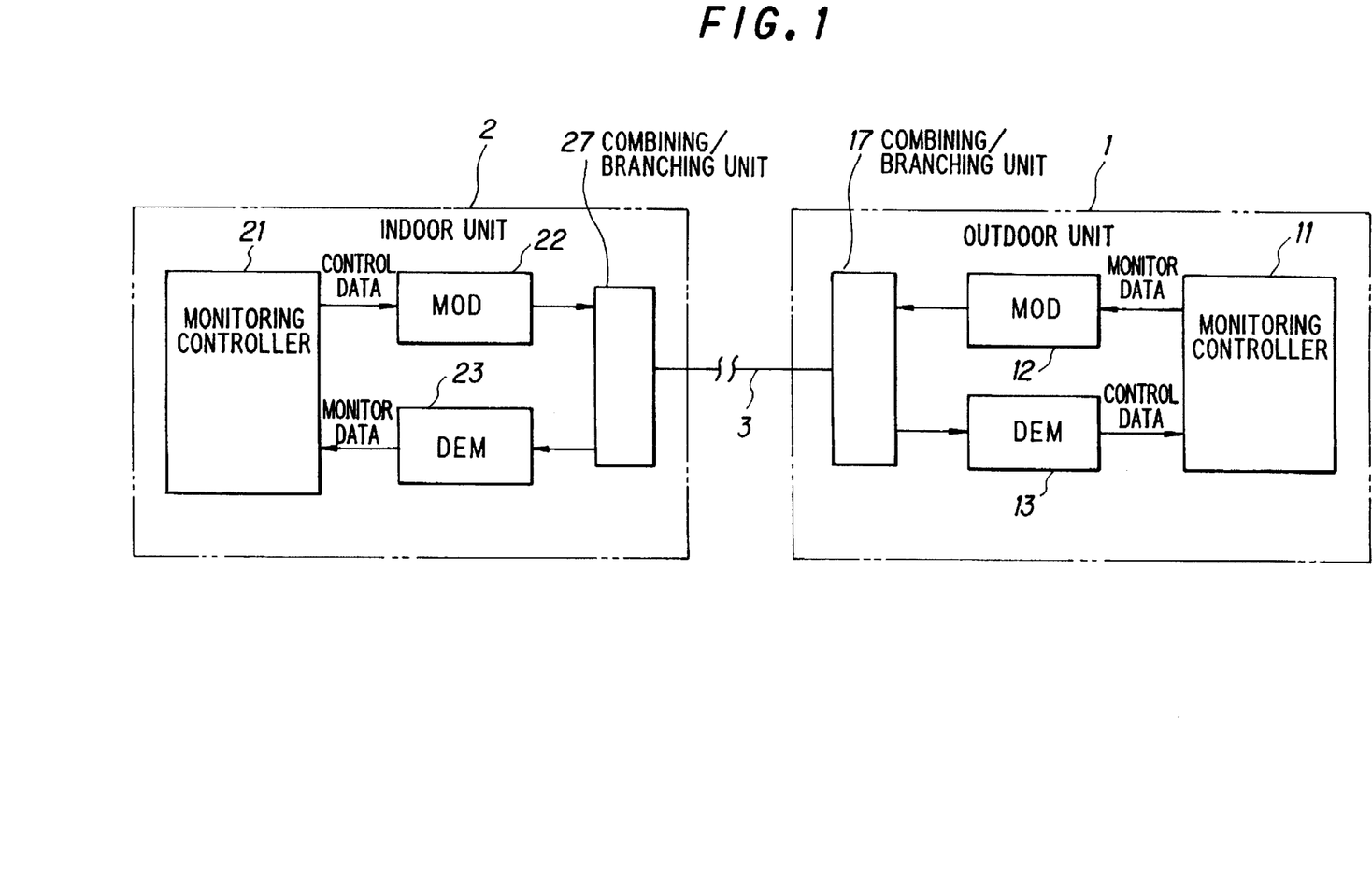
FIG. 1 is a block diagram for describing an overview of the present invention.

FIG. 1 is a diagram for describing the general features of the present invention.

Illustrated in FIG. 1 are the outdoor unit 1 including a transmitter and a receiver, the indoor unit 2 for controlling the outdoor unit, and the coaxial cable 3 connecting the outdoor and indoor units for sending and receiving, by frequency multiplexing, a transmission signal, a reception signal, a control signal which controls the outdoor unit, a monitor signal which notifies an indoor unit of the state of the outdoor unit and a reference frequency signal. The outdoor unit 1 includes the monitoring controller 11 which monitors various states of the outdoor unit as well as alarms, transmits these to the indoor unit as monitor signals and performs prescribed control based upon a control signal communicated from the indoor unit; the modulator 12 for modulating a carrier of frequency $f_1$ (=7.65 MHz) by the monitor data and transmitting the modulated signal; the demodulator 13 for demodulating modulated waves of frequency $f_2$ (=6.5 MHz) sent from the indoor unit and entering control data into the monitoring controller 11; and the combining/branching unit 17 for combining/branching various signals. The indoor unit 2 includes the monitoring controller 21 for transmitting various set data to the outdoor unit as a control signal, and for performing prescribed control based upon a monitor signal communicated from the outdoor unit; the modulator 22 for modulating the carrier of frequency $f_2$ (=6.5 MHz) by control data and transmitting the modulated signal; the demodulator 23 for demodulating modulated waves of frequency $f_1$ (=7.65 MHz) sent from the outdoor unit and entering monitor data into the monitoring controller 21; and the combining/branching unit 27 for combining/branching various signals.

The outdoor unit 1 notifies the indoor unit 2 of normal operation by transmitting an unmodulated carrier to the indoor unit via the cable 3 when operation is normal, notifies the indoor unit 2 of an abnormality by transmitting a monitor signal, which is obtained by modulating a carrier by alarm data, to the indoor unit when operation is abnormal, and restores the carrier to the unmodulated state at recovery from the abnormality. If this arrangement is adopted, phase noise and the characteristic of spuriousness in the vicinity of the local oscillation frequency are unaffected even if the unmodulated carrier leaks into the reference frequency signal system. As a result, no deterioration is caused in the quality of the communication system. Further, since the carrier can be modulated by the alarm data and communicated to the indoor unit at the time of an abnormality, monitoring of the outdoor unit, namely monitoring of the transmitter and receiver, can be performed in the indoor unit. Though the modulated waves (the monitor signal) leak into the reference frequency signal system and influence the phase noise and the characteristic of spuriousness in the vicinity of the local oscillation frequency in such case, no problems arise because transmission/reception is halted at occurrence of the abnormality. Furthermore, since it suffices merely to transmit unmodulated waves at normal operation and transmit modulated waves at abnormal operation, deterioration in the spectrum of the reference frequency signal can be prevented by a simple arrangement.

At the time of normal operation, the outdoor unit 1 detects the transmission output level, changes the frequency of the unmodulated carrier in stages in conformity with the transmission output level and transmits the frequency to the indoor unit 2. The indoor unit 2 discriminates the frequency of the unmodulated carrier and identifies the transmission output level. If this arrangement is adopted, there is no influence upon the phase noise and the characteristic of spuriousness in the vicinity of the local oscillation frequency and, moreover, the transmission output level can be communicated to the outdoor unit.

The indoor unit 2 transmits an unmodulated carrier to the outdoor unit 1 via the cable if it is unnecessary to send a control signal, transmits a modulated signal, which is obtained by modulating a carrier by control data, to the outdoor unit 1 via the cable if it is necessary to send a control signal. If this arrangement is adopted, phase noise and the characteristic of spuriousness in the vicinity of the local oscillation frequency are unaffected even if the unmodulated carrier leaks into the reference frequency signal system. As a result, no deterioration is caused in the quality of the communication system. Further, when it is necessary to send the control signal, the carrier can be modulated by control data and communicated to the outdoor unit 1. As a result, the outdoor unit performs prescribed control in accordance with the indication from the indoor unit. In this case, the modulated waves (the control signal) leak into the reference frequency signal system and influence the phase noise and the characteristic of spuriousness in the vicinity of the local oscillation frequency. However, the control data is various setting data and is not sent during transmission and reception. The data is sent before the start of transmission/reception. This means that no problems arise. Furthermore, since it suffices merely to transmit unmodulated waves when it is unnecessary to send the control signal and transmit modulated waves when it is necessary to send the control signal, deterioration in the spectrum of the reference frequency signal can be prevented by a simple arrangement.

In a case where a failure has occurred in the monitoring control system of the indoor unit 2, the indoor unit 2 halts the transmission of the carrier of the control signal to the outdoor unit 1 and the outdoor unit 1 detects the interruption of the carrier of the control signal and halts the emission of radio waves. If this arrangement is adopted, the outdoor unit 1 halts transmission immediately and can prevent erroneous transmission in case of CPU runaway or some other abnormality.

When the indoor unit 2 has detected interruption of the carrier of the monitor signal from the outdoor unit 1, the indoor unit 2 sends the outdoor unit 1 a control signal for halting emission of radio waves. The outdoor unit receives the control signal and terminates the radio-wave emission. More specifically, in a case where an abnormality not detectable by the outdoor unit 1 itself has occurred in the outdoor unit, e.g., if a failure has occurred in the amplifier at the output stage of the monitor signal or if a problem has developed in the cable, the outdoor unit 1 will not send the monitor signal to the indoor unit 2. In such case, however, the indoor unit 2 can no longer detect the carrier of the monitor signal (i.e., carrier cut-off occurs). Accordingly, the indoor unit 2 instructs the outdoor unit 1 to halt the emission of radio waves on the grounds that a failure undetectable by the outdoor unit 2 itself has occurred. As a result, transmission can be halted promptly even in a case where an abnormality undetectable by the outdoor unit itself has occurred in the outdoor unit.

(B) First Embodiment

Figure 2:
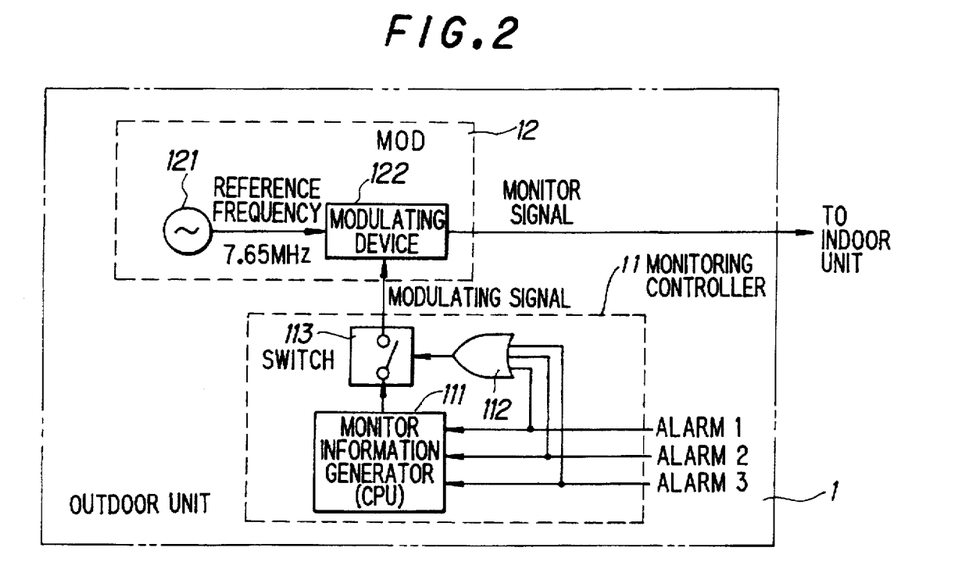
FIG. 2 is a diagram showing the construction of an outdoor unit in a first embodiment of the present invention.

FIG. 2 is a diagram showing the construction of an outdoor unit in a first embodiment of the present invention. Numeral 1 denotes the outdoor unit having the monitoring controller 11 which monitors various states of the outdoor unit as well as alarms, transmits these to the indoor unit as monitor signals and performs prescribed control based upon a control signal communicated from the indoor unit, and the modulator 12 for modulating the carrier of frequency $f_1$ (=7.65 MHz) by the monitor data and transmitting the modulated signal.

The monitoring controller 11 includes a monitor information generator 111 constituted by a microcomputer. Alarms 1–3 (an alarm indicating of a drop in voltage level, an alarm indicating of a rise in temperature and an alarm indicating loss of PLL synchronism, etc.) enter the monitor information generator 111 from various status detectors (not shown), and the generator 111 creates and outputs monitor data (a modulating signal) conforming to each alarm. The monitoring controller 11 further includes an OR gate 112 which outputs a high-level signal when at least one alarm is generated, and a switch 113 which closes to enter the monitor data (modulating signal) from the monitor information generator 111 to the modulator 12 when the output of the OR gate is at the high level (when an alarm is being generated), and which opens so as not to enter the monitor data (modulating signal) into the modulator 12 when the output of the OR gate is at the low level (namely when an alarm is not being generated).

The modulator 12 includes a carrier generator 121 for outputting the carrier having the frequency $f_1$ (=7.65 MHz), and a modulating device 122 for modulating the carrier by a modulating signal (monitor data) and sending the monitor signal to the indoor unit via a combining/branching unit (not shown).

If an alarm is not being generated, the switch 113 opens, the modulating device 122 does not modulate the carrier by the monitor data and sends the indoor unit the unmodulated carrier wave. The indoor unit detects the unmodulated carrier and judges that an abnormality has not occurred in the outdoor unit 1.

When modulation is not being performed, phase noise and the characteristic of spuriousness in the vicinity of the local oscillation frequency are unaffected even if the unmodulated carrier leaks into the reference frequency signal system of the outdoor unit. As a result, no deterioration is caused in the quality of the communication system.

When an alarm is produced, on the other hand, the monitor information generator 111 generates monitor data conforming to the alarm and the switch 113 closes. As a result, the monitor data (modulating signal) enters the modulating device 122. The latter modulates the carrier signal by the monitor data and sends the monitor signal to the indoor unit. In this case, the modulated carrier (monitor signal) leaks into the reference frequency signal system of the outdoor unit to affect the phase noise and the characteristic of spuriousness in the vicinity of the local oscillation frequency. However, no problems arise because transmission/reception is halted at occurrence of the alarm. If the normal state is restored and the alarm is no longer produced, the switch 113 opens and the unmodulated carrier is transmitted to the indoor unit.

(C) Second Embodiment

Figure 3:
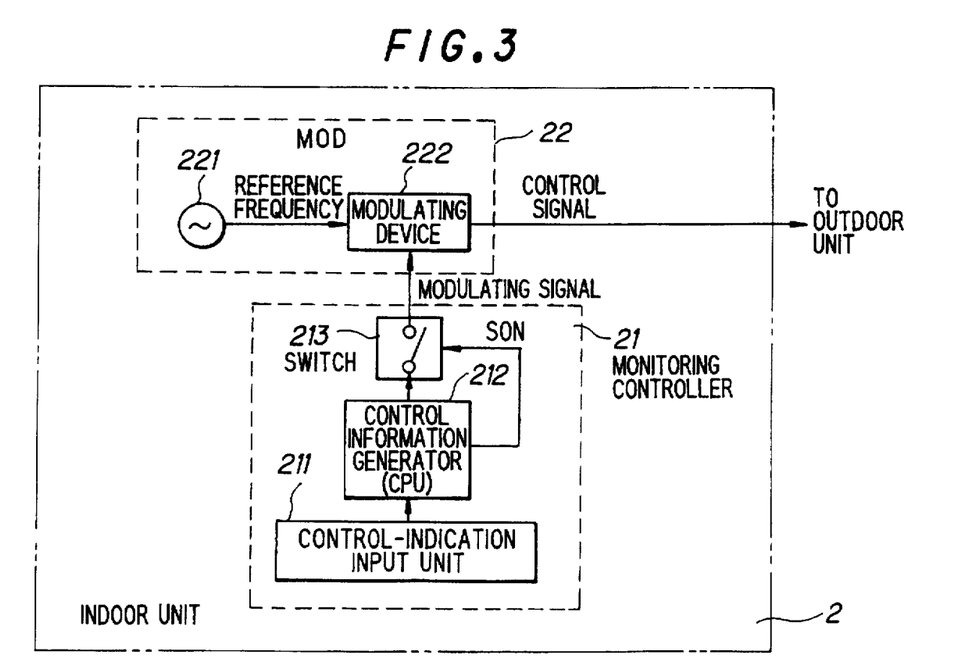
FIG. 3 is a diagram showing the construction of an indoor unit in a second embodiment of the present invention.

FIG. 3 is a diagram showing the construction of the indoor unit 2 according to a second embodiment of the present invention. The indoor unit 2 includes the monitoring controller 21 for transmitting various set data to the outdoor unit as a control signal, and for performing prescribed control based upon a monitor signal communicated from the outdoor unit, and the modulator 22 for modulating the carrier of frequency $f_2$ (=6.5 MHz) by control data and transmitting the modulated signal.

The monitoring controller 21 includes a control-indication input unit 211 such as a terminal or operating switch for performing various settings (gain adjustment, synthesizer frequency dividing ratio, power, etc.); a control information generator 212, constituted by a microcomputer, for generating control data designated by the control-indication input unit 211 and outputting a switch enable signal SON; and a switch 213 which closes to enter the control data (modulating signal) from the control information generator 212 to the modulator 22 when the switch enable signal SON is at the high level (when the control data is set), and which opens so as not to enter the control data (modulating signal) into the modulator 22 when the switch enable signal SON is at the low level (namely when a setting is not made).

The modulator 22 includes a carrier generator 221 for outputting a carrier signal having the frequency $f_1$ (=6.5 MHz), and a modulating device 222 for modulating the carrier by a modulating signal (control data) and sending the modulated signal to the outdoor unit via a combining/branching unit (not shown).

If control data is not set, the switch 213 opens, the modulating device 222 does not modulate the carrier by the control data and sends the outdoor unit the unmodulated carrier signal. On the basis of reception of the unmodulated carrier, the outdoor unit judges that control data has not been set.

When modulation is not being performed, phase noise and the characteristic of spuriousness in the vicinity of the local oscillation frequency are unaffected even if the unmodulated carrier leaks into the reference frequency signal system of the outdoor unit. As a result, no deterioration is caused in the quality of the communication system.

When control data is set, on the other hand, the control information generator 212 generates control data conforming to the indication from the control-information input unit 211 and generates the high-level switch enable signal SON. As a result, the switch 213 closes and the control data (modulating signal) enters the modulating device 222. The latter modulates the carrier signal by the control data and sends the modulated carrier signal to the outdoor unit. In this case, the modulated carrier (control signal) leaks into the reference frequency signal system of the outdoor unit to affect the phase noise and the characteristic of spuriousness in the vicinity of the local oscillation frequency. However, no problems arise because the setting of the control data is performed after halting transmission/reception.

(D) Third Embodiment (a) Configuration

Figure 4:
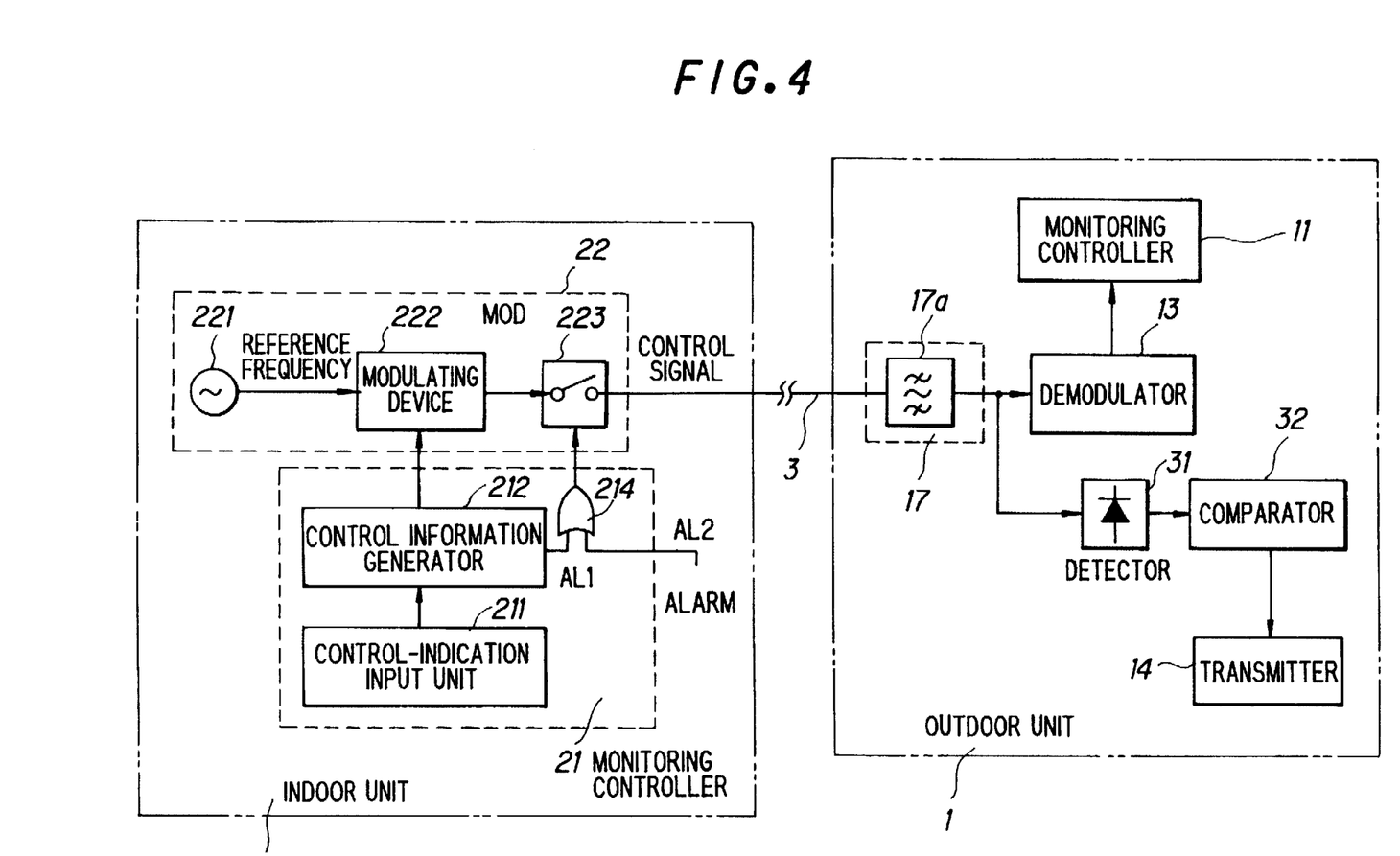
FIG. 4 is a diagram showing the construction of a third embodiment of the present invention.

FIG. 4 is a diagram showing the construction of a transmitter-receiver apparatus according to a third embodiment of the present invention. Illustrated in FIG. 4 are the outdoor unit 1 including a transmitter and a receiver, the indoor unit 2 for controlling the outdoor unit, and the coaxial cable 3 connecting the outdoor and indoor units for sending and receiving, by frequency multiplexing, a transmission signal, a reception signal, a control signal which controls the outdoor unit, a monitor signal which notifies an indoor unit of the state of the outdoor unit and a reference frequency signal.

The outdoor unit 1 includes the monitoring controller (control information reproduction unit) 11 which monitors various states of the outdoor unit as well as alarms, transmits these to the indoor unit as monitor signals and performs prescribed control based upon a control signal communicated from the indoor unit; the demodulator 13 for demodulating modulated waves of frequency $f_2$ (=6.5 MHz) sent from the indoor unit and entering control data into the control information reproduction unit 11; the transmitter 14 for converting a transmission signal of frequency $f_3$ (=140 MHz) sent from the indoor unit to a wireless frequency on the gigahertz order, performing high-frequency amplification and sending the amplified signal to an antenna; the combining/branching unit 17 for combining/branching various signals, the latter having a band-pass filter 17a whose center frequency is $f_2$ (=6.5 MHz); a detector 31 for detecting the output of the band-pass filter; and a comparator 32 for comparing the detected output and a set level to detect absence (interruption) of the carrier of frequency $f_2$ (=6.5 MHz), and for instructing the transmitter 14 to halt transmission.

The indoor unit 2 includes the monitoring controller 21 for transmitting various set data to the outdoor unit as a control signal, and for performing prescribed control based upon monitor data communicated from the outdoor unit, and the modulator 22 for modulating the carrier of frequency $f_2$ (=6.5 MHz) by control data and transmitting the modulated signal. The monitoring controller 21 includes the control-indication input unit 211 such as a terminal or operating switch for performing various settings (gain adjustment, synthesizer frequency dividing ratio, power, etc.); the control information generator 212, constituted by a microcomputer, for generating control data designated by the control-indication input unit 211 and outputting an alarm signal AL1 at microcomputer runaway; and an OR gate 214 for taking the OR between an alarm signal AL1 and an alarm signal AL2, which attains at generation of another alarm in the indoor unit 2. The modulator 22 includes the carrier generator 221 for outputting a carrier signal having the frequency $f_1$ (=6.5 MHz); the modulating device 222 for modulating the carrier by a modulating signal (control information) and sending the control signal to the outdoor unit via a combining/branching unit (not shown); and a switch 223 which closes when the output of the OR gate 214 assumes the low level (i.e., at the time of normal operation when an alarm is not being generated) and opens when the output of the OR gate 214 attains the high level (i.e., when an alarm is generated).

(b) Operation

At the time of normal operation when an alarm is not being generated in the indoor unit 2, the switch 223 closes so that modulated waves, which are obtained by modulating the carrier by control data, are sent to the outdoor unit 1 via the switch 223 and the cable 3. The outdoor unit 1 performs prescribed control based upon the control data sent.

However, when CPU runaway or another alarm develops in the indoor unit 2, the output of the OR gate 214 attains the high level and the switch 223 opens. As a result, the carrier signal of frequency $f_1$ (=6.5 MHz) is no longer sent to the outdoor unit 1.

In the outdoor unit 1, the detector 31 detects the carrier signal of frequency $f_1$ (=6.5 MHz) and outputs a voltage signal conforming to the reception level of the carrier signal. The comparator compares the detected output level and the set level and detects carrier absence (carrier interruption) if the detected output is less than the set level. In case of carrier interruption, the comparator 32 judges that some alarm has been generated in the indoor unit 2 and halts the operation of the transmitter 14, thereby terminating the emission of radio waves. Conceivable methods of halting the operation of the transmitter 14 include stopping the supply of power to the amplifier within the transmitter, controlling the voltage of a variable attenuator or changing over an IF or RF switch.

If the arrangement described above is adopted, the outdoor unit 1 halts transmission immediately and can prevent erroneous communication if the indoor unit 2 develops CPU runaway or some other abnormality. Similar control is perform also in a case where a failure develops in the cable 3.

(c) Modification

According to the third embodiment of FIG. 4, carrier transmission is interrupted when an alarm is generated in the indoor unit 2. However, an arrangement can be adopted in which the second and third embodiments are combined. Specifically, an arrangement can be adopted in which the unmodulated carrier is transmitted when control data is not set (the second embodiment) and transmission of the unmodulated carrier is halted if an alarm is generated in the indoor unit 2 (the third embodiment).

(E) Fourth Embodiment (a) Configuration

Figure 5:
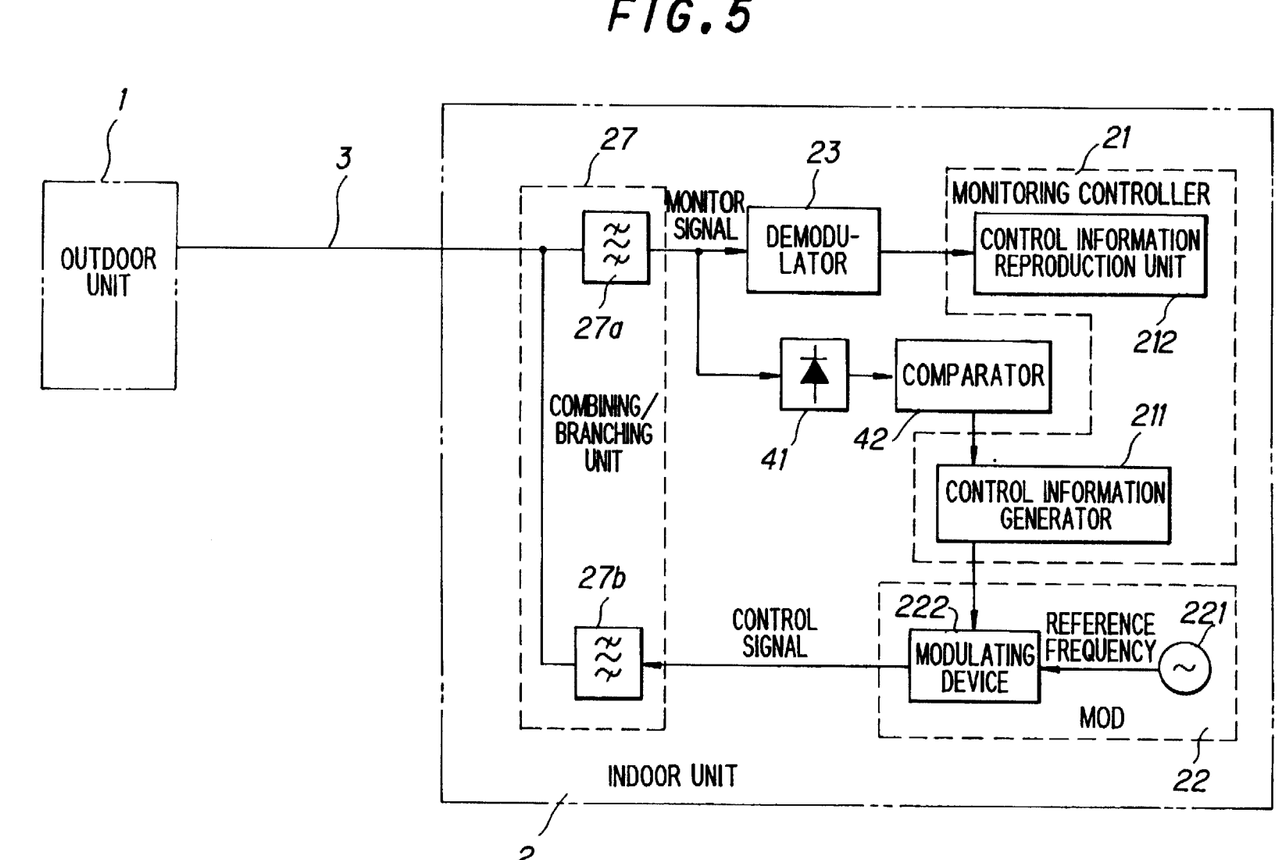
FIG. 5 is a diagram showing the construction of a fourth embodiment of the present invention.

FIG. 5 is a diagram showing the construction of a transmitter-receiver apparatus according to a fourth embodiment of the present invention. Illustrated in FIG. 5 are the outdoor unit 1 including a transmitter and a receiver, the indoor unit 2 for controlling the outdoor unit and the coaxial cable 3.

The indoor unit 2 includes the monitoring controller 21 for transmitting various set data to the outdoor unit as a control signal, and for performing prescribed control based upon monitor data communicated from the outdoor unit. The monitoring controller 21 has the control information generator 211 and the control information regenerating unit 212. The indoor unit 2 further includes the modulator 22 for modulating the carrier of frequency $f_2$ (=6.5 MHz) by control data and transmitting the modulated signal. The modulator 22 has the carrier generator 221 for outputting a carrier signal having the frequency $f_1$ (=6.5 MHz), and the modulating device 222 for modulating the carrier by a modulating signal (control data) and sending the modulated signal to the outdoor unit. The indoor unit 2 further includes the demodulator 23 for demodulating modulated waves of frequency $f_1$ (=7.65 MHz) sent from the outdoor unit 1 and entering monitor data into the monitoring controller 21, and the combining/branching unit 27 for combining/branching various signals. The combining/branching unit 27 has a band-pass filter 27a, the center frequency of which is $f_1$ (=7.65 MHz), for passing the monitor signal, and a band-pass filter 27b, the center frequency of which is $f_2$ (=6.5 MHz), for passing the control signal. Numeral 41 denotes a detector for detecting the output of the band-pass filter 27a, and a comparator 42 for comparing the detected output and a set level to detect absence (interruption) of the carrier of frequency $f_1$ (=7.65 MHz), and for so notifying the control information generator 211.

(b) Operation

In a case where an abnormality not detectable by the outdoor unit 1 itself has occurred in the outdoor unit 1, e.g., if a failure has occurred in the amplifier at the output stage of the monitor signal or if a problem has developed in the cable, the outdoor unit 1 cannot send the indoor unit 2 the monitor data that notifies of the failure. In such case, however, the carrier signal level of frequency $f_1$ (=7.65 MHz) declines and so does the output of the detector 41. The comparator 42 compares the detector output and the set level. When the detector output is less than the set level, i.e., when the carrier of the monitor signal can no longer be detected (carrier interruption), the control information generator 211 is so notified.

In response to such notification, the control information generator 211 generates transmission-output termination data on the grounds that a failure undetectable by the outdoor unit itself has occurred. The modulator 22 modulates the carrier of frequency $f_2$ (=6.5 MHz) by the transmission-output termination data and transmits the modulated carrier to the outdoor unit 1 via the band-pass filter 27b and cable 3, as a result of which the outdoor unit 1 halts the emission of radio waves based upon this control information.

As a result of the foregoing operation, transmission can be halted immediately even in a case where an abnormality undetectable by the outdoor unit 1 itself has occurred in the outdoor unit.

(F) Fifth Embodiment (a) Overview

The first embodiment is such that when an abnormality has not occurred in the outdoor unit 1, the outdoor unit 1 transmits the unmodulated carrier signal of frequency $f_1$ (=7.65 MHz) to the indoor unit 2, whereupon the indoor unit 2 responds to reception of the unmodulated carrier signal by judging that the outdoor unit is operating normally. In the first embodiment, a state other than an alarm, e.g., the transmission output level, can no longer be communicated to the indoor unit. In the fifth embodiment described below, the transmission output level or the like can be communicated to the indoor unit even in an arrangement according to the first embodiment.

(b) Configuration

Figure 6:
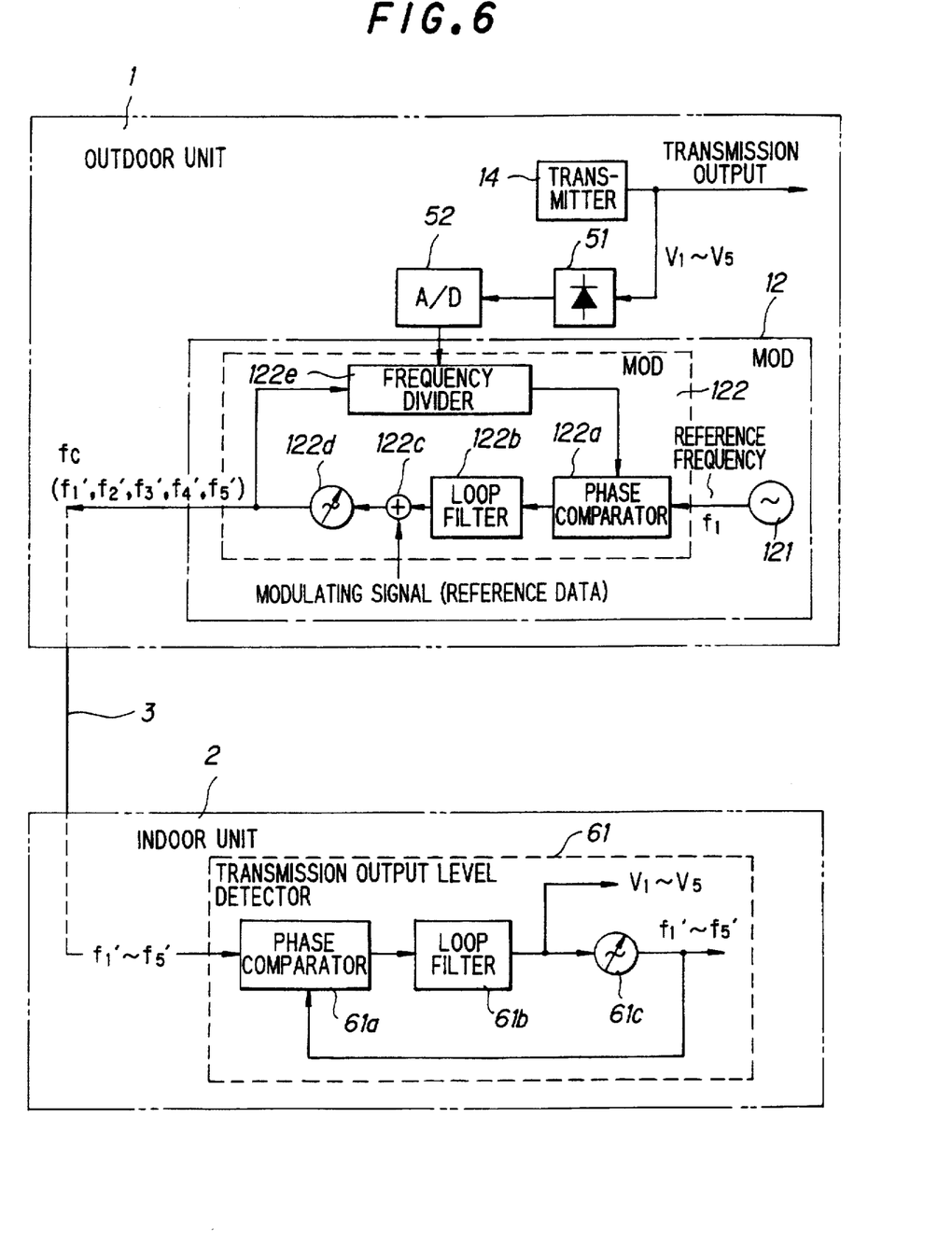
FIG. 6 is a diagram showing the construction of a fifth embodiment of the present invention.

FIG. 6 is a diagram showing the construction of a transmitter-receiver apparatus according to a fifth embodiment of the present invention. Illustrated in FIG. 6 are the outdoor unit 1 including a transmitter and a receiver, the indoor unit 2 for controlling the outdoor unit and the coaxial cable 3.

The outdoor unit 1 includes the modulator 12 for modulating the carrier of frequency $f_1$ (=7.65 MHz) by the monitor data (modulating signal) and transmitting the modulated signal; the transmitter 14 for converting the transmission signal of frequency $f_3$ (=140 MHz) sent from the indoor unit to a radio frequency on the gigahertz order, performing high-frequency amplification and sending the amplified signal to an antenna; a detector 51 for detecting the output of the transmitter 14 and outputting a voltage conforming to the transmission output level; and an A/D converter 52 for converting the transmission output level to a digital signal.

The modulator 12 includes the reference signal generator 121 for outputting the carrier signal having the frequency $f_1$ (=7.65 MHz), and the modulating device 122 for modulating the carrier by monitor data (modulating signal). The modulating device 122 has a phase comparator 122a, a loop filter 122b for smoothing the signal outputted by the phase comparator 122a, an adder 122c for adjusting the output voltage of the loop filter 122b based upon the modulating signal, a voltage-controlled oscillator 122d for outputting a carrier signal whose frequency $f_c$ is proportional to the voltage outputted by the adder 122c, and a frequency divider 122e for deciding a frequency dividing ratio $N_i$ based upon the digital value (transmission output value) outputted by the A/D converter 52 and frequency-dividing the frequency $f_c$ of the carrier signal to $1/N_i$. The modulating device 122 performs control in such a manner that the relation $f_1=f_c/N_i$, i.e., $f_c=N_i \cdot f_1$, is established, and outputs a carrier signal of frequency $f_c$. The frequency $f_c$ of the carrier wave can be controlled to $f_1'$~$f_5'$ by changing $N_i$.

The frequency divider 122e divides the digital value from the A/D converter 52 in, say, five stages and sets frequency dividing ratios $N_1$, $N_2$, $N_3$, $N_4$, $N_5$ ($N_i<N_{i+1}$) in order of increasing level. As a result, an unmodulated carrier signal is transmitted from the modulator 12 to the indoor unit 2, wherein the lower the transmission output level, the lower the frequency $f_c$ (=$N_i \cdot f_1$) of the unmodulated carrier signal.

The indoor unit 2 includes a detector 61 of the transmission output level. The level detector 61 has a phase comparator 61, a loop filter 61b for smoothing the signal outputted by the phase comparator 61a, and a voltage-controlled oscillator 61c for outputting a frequency signal whose frequency $f_c$ is proportional to the output voltage outputted by the loop filter. The phase comparator 61a outputs a voltage signal, which conforms to the phase difference between the received carrier signal and the frequency signal of the voltage-controlled oscillator 61c, and performs control in such a manner that the phase difference becomes zero. Accordingly, the loop filter 61b outputs voltages $V_1$~$V_5$ conforming to the reception carrier frequencies $f_c$ (=$N_i \cdot f_1$) from the loop filter 61b. This means that the transmission output level can be identified by the signal level.

(c) Overview of Operation

To sum up the foregoing, the outdoor unit 1 detects the transmission output level and transmits the indoor unit 2 an unmodulated carrier signal of a frequency $f_1'$~$f_5'$ conforming to the transmission output level. The indoor unit 2 discriminates the frequency of the unmodulated carrier and identifies the transmission output level. If the above-described arrangement is adopted, phase noise and the characteristic of spuriousness in the vicinity of the local oscillation frequency are unaffected and the transmission output level can be communicated to the outdoor unit.

Thus, in accordance with the present invention, the outdoor unit notifies the indoor unit of normal operation by transmitting an unmodulated carrier to the indoor unit via the cable when operation is normal, notifies the indoor unit of an abnormality by transmitting a monitor signal, which is obtained by modulating a carrier by alarm data, to the indoor unit when operation is abnormal, and restores the carrier to the unmodulated state at recovery from the abnormality. If this arrangement is adopted, phase noise and the characteristic of spuriousness in the vicinity of the local oscillation frequency are unaffected even if the unmodulated carrier leaks into the reference frequency signal system when modulation is not performed. As a result, no deterioration is caused in the quality of the communication system. Furthermore, since it suffices merely to transmit unmodulated waves at normal operation and transmit modulated waves at abnormal operation, deterioration in the spectrum of the reference frequency signal can be prevented by a simple arrangement.

In accordance with the present invention, the outdoor unit detects the transmission output level at the time of normal operation, changes the frequency of the unmodulated carrier in stages in conformity with the transmission output level and transmits the frequency to the indoor unit. The indoor unit discriminates the frequency of the unmodulated carrier and identifies the transmission output level. As a result, there is no influence upon the phase noise and the characteristic of spuriousness in the vicinity of the local oscillation frequency and, moreover, the transmission output level can be communicated to the outdoor unit.

According to the present invention, the indoor unit transmits an unmodulated carrier to the outdoor unit via the cable if it is unnecessary to send a control signal, and transmits a modulated control signal, which is obtained by modulating a carrier by control data, to the outdoor unit via the cable if it is necessary to send a control signal. If this arrangement is adopted, phase noise and the characteristic of spuriousness in the vicinity of the local oscillation frequency are unaffected even if the unmodulated carrier leaks into the reference frequency signal system. As a result, no deterioration is caused in the quality of the communication system. Furthermore, since it suffices merely to transmit unmodulated waves when it is unnecessary to send the control signal and transmit modulated waves when it is necessary to send the control signal, deterioration in the spectrum of the reference frequency signal can be prevented by a simple arrangement.

The present invention is such that in a case where a failure has occurred in the monitoring control system of the indoor unit, the indoor unit halts the transmission of the carrier of the control signal to the outdoor unit and the outdoor unit detects the interruption of the carrier of the control signal and halts the emission of radio waves. As a result, the outdoor unit can halt transmission immediately and prevent erroneous transmission in case of CPU runaway or some other abnormality.

The present invention is such that when the indoor unit has detected interruption of the carrier of the monitor signal from the outdoor unit, the indoor unit sends the outdoor unit a control signal for halting emission of radio waves. The outdoor unit receives the control signal and terminates the radio-wave emission. As a result, transmission can be halted promptly even in a case where an abnormality undetectable by the outdoor unit itself has occurred in the outdoor unit.

As many apparently widely different embodiments of the present invention can be made without departing from the spirit and scope thereof, it is to be understood that the invention is not limited to the specific embodiments thereof except as defined in the appended claims.

What is claimed is:

1. A transmitter-receiver apparatus for sending and receiving, by frequency multiplexing, a transmission signal, a reception signal, a control signal which controls an outdoor unit, a monitor signal which notifies an indoor unit of the state of the outdoor unit and a reference frequency signal, between the outdoor unit and the indoor unit via a cable connecting the indoor unit and the outdoor unit, wherein said outdoor unit includes a transmitter-receiver and said indoor unit controls said outdoor unit;

said outdoor unit having means for notifying the indoor unit of normal operation by transmitting an unmodulated carrier to the indoor unit via the cable when operation is normal, notifying the indoor unit of an abnormality by transmitting a modulated signal, which is obtained by modulating the carrier by alarm data, to the indoor unit when operation is abnormal, and restoring the carrier to the unmodulated state at recovery from the abnormality; and said indoor unit having means for transmitting an unmodulated carrier to the outdoor unit via the cable if it is unnecessary to send control data, and transmitting a modulated signal, which is obtained by modulating the carrier by the control data, to the outdoor unit via the cable if it is necessary to send the control data.

2. The apparatus according to claim 1, wherein:

said outdoor unit has a detector for detecting a transmission output level, and a carrier frequency controller for changing the frequency of the unmodulated carrier in stages in conformity with the transmission output level; and said indoor unit has identification means for identifying the transmission output level by discriminating the frequency of the unmodulated carrier.

3. The apparatus according to claim 1, wherein said indoor unit has means for halting transmission of the carrier of a control signal sent to the outdoor unit in a case where a failure has occurred in the indoor unit; and said outdoor unit has means for detecting interruption of the carrier of the control signal and halting emission of radio waves.

4. The apparatus according to claim 1, wherein said indoor unit has means for detecting interruption of the carrier of the monitor signal from the outdoor unit, and means for sending the outdoor unit a control signal which halts emission of radio waves when the interruption of the carrier has been detected.

\* \* \* \* \*